(12) United States Patent
Chen (10) Patent No.: US 7,744,728 B2
(45) Date of Patent: Jun. 29, 2010

(54) APPARATUS FOR AND METHOD OF PRODUCING HYDROGEN USING MICROWAVES

(76) Inventor: Wei-Hsin Chen, No. 49, Lane 398, Bade S. Rd., Renwu Hsiang, Kaohsiung Hsien (TW)

( * ) Notice: Subject to any disclaimer, the term of this patent is extended or adjusted under 35 U.S.C. 154(b) by 328 days.

(21) Appl. No.: 11/826,239

(22) Filed: Jul. 13, 2007

(65) Prior Publication Data
US 2009/0014315 A1    Jan. 15, 2009

(51) Int. Cl.
*A62D 3/10* (2007.01)
*B01J 7/00* (2006.01)
(52) U.S. Cl. .................. 204/157.43; 48/61; 204/157.52; 423/648.1; 423/650; 423/652; 423/655
(58) Field of Classification Search ............ 204/157.43, 204/157.52; 252/373; 423/650–654, 648.1, 423/655; 48/61
See application file for complete search history.

(56) References Cited

U.S. PATENT DOCUMENTS

| 4,435,374 | A | * | 3/1984 | Helm, Jr. .................. 423/418.2 |
| 5,397,555 | A | * | 3/1995 | Steinwandel et al. ..... 423/215.5 |
| 6,258,329 | B1 | * | 7/2001 | Mutterer et al. ........ 422/186.29 |
| 6,403,939 | B1 | * | 6/2002 | Fagrell ....................... 219/709 |
| 7,037,484 | B1 | * | 5/2006 | Brandenburg ............ 423/648.1 |

\* cited by examiner

*Primary Examiner*—Wayne Langel
(74) *Attorney, Agent, or Firm*—Bacon & Thomas, PLLC (57) ABSTRACT

An apparatus for producing hydrogen by microwave includes a microwave heater, a reaction tube comprising a catalyst bed, a cap, an output unit and a microwave control box. A method of producing hydrogen using microwaves has steps of feeding gas and liquid, vaporizing the liquid to from a mixed gas and heating the mixed gas. A liquid and a gas are selected at predetermined ratios to form the mixed gas that reacts on the catalyst bed to from hydrogen. Microwaves allow the apparatus to be ready for production quicker and reduce space required by the apparatus. Heating the liquid and gas using microwaves is fast so has a good energy efficiency.

19 Claims, 7 Drawing Sheets

APPARATUS FOR AND METHOD OF PRODUCING HYDROGEN USING MICROWAVES

BACKGROUND OF THE INVENTION

1. Field of Invention

The present invention relates to an apparatus for and method of producing hydrogen, and more particularly to an apparatus for and method of producing hydrogen using microwaves.

2. Description of the Related Art

Hydrogen is an important industrial material and is needed in ammonia synthesis with nitrogen to produce fertilizers, methanol production using carbon dioxide and in hydrodesulfurization and hydrocracking in the petroleum industry. Since the combustion of hydrogen produces no greenhouse gases, hydrogen is becoming a replacement fuel for hydrocarbons.

Conventional methods of hydrogen production include electrolysis, biological production, photo-electrochemical reactions and heat treatment reactions. However, electrolysis of water consumes a lot of electricity so only a small amount of hydrogen is produced this way. The rate of biological production is slow and technology for acclimating microbes is also complicated. The efficiency of photoelectrochemical reaction is low and suitable materials are still under development. Consequently, heat treatment is the most common method of hydrogen production.

Reactions used in heat treatment include water gas shift, steam reforming, gasification and pyrolysis and require a heat source to attain a reaction temperature and may use biomass, methanol, ethanol, natural gas, oil, coal and coke as at least one reactant. In conventional processes, the heat source may be combustion or electric heating. However, the temperature is hard to control when heating by combustion. Electric heating needs a relatively long time to attain reaction temperature and also a large heating space, which costs additional energy, time and space.

To overcome the shortcomings, the present invention provides an apparatus for and method of producing hydrogen by microwave to mitigate or obviate the aforementioned problems.

SUMMARY OF THE INVENTION

The primary objective of the present invention is to provide an apparatus for and method of producing hydrogen using microwaves to reduce energy, time and space required for hydrogen production.

An apparatus for producing hydrogen using microwaves in accordance with the present invention comprises a microwave heater, a reaction tube, a cap, an output unit and a microwave control box. The microwave heater comprises a metal housing, a heating chamber and a magnetron. The heating chamber is defined in the housing. The magnetron is mounted in the housing to produce and guide microwaves towards the heating chamber.

The reaction tube is mounted in the heating chamber of the microwave heater and has a tube body, a supporting layer, a catalyst bed and a thermal storage layer. The tube body has a top end and a bottom end. The supporting layer is mounted in the tube body. The catalyst bed is mounted in the tube body on the supporting layer. The thermal storage layer is mounted in the tube body on the catalyst bed.

The cap is mounted on the housing of the microwave heater and comprises a connecting member having a gas inlet, a liquid inlet and a sensor mount which all communicate with the top end of the tube body of the reaction tube. The output unit comprises a mounting member and an outlet tube. The mounting member is mounted on the housing of the microwave heater. The outlet tube extends through the mounting member and communicates with the bottom end of the tube body of the reaction tube.

The microwave control box is connected electrically to the microwave heater and has a thermal sensor, a temperature setting unit and a power controller. The thermal sensor is mounted in the catalyst bed through the sensor inlet. The power controller is connected electrically to the thermal sensor, the temperature setting unit and the magnetron.

A method of producing hydrogen by microwave in accordance with the present invention comprises steps of feeding gas and liquid, vaporizing the liquid to produce a mixed gas and heating the mixed gas.

In the step of feeding gas and liquid, gas and liquid are fed concurrently into the reaction tube of the aforementioned apparatus respectively through the gas inlet and the liquid inlet of the cap.

In the step of vaporizing liquid, the liquid and gas flow into the thermal storage layer in the reaction tube to vaporize the liquid to form liquid vapor that mixes uniformly with the gas to form a mixed gas.

In the step of heating the mixed gas, the mixed gas flows into the catalyst bed in the reaction tube to perform a reaction of hydrogen production at a temperature reached and sustained by microwaves.

Other objectives, advantages and novel features of the invention will become more apparent from the following detailed description when taken in conjunction with the accompanying drawings.

DETAILED DESCRIPTION OF THE INVENTION

Figure 1:
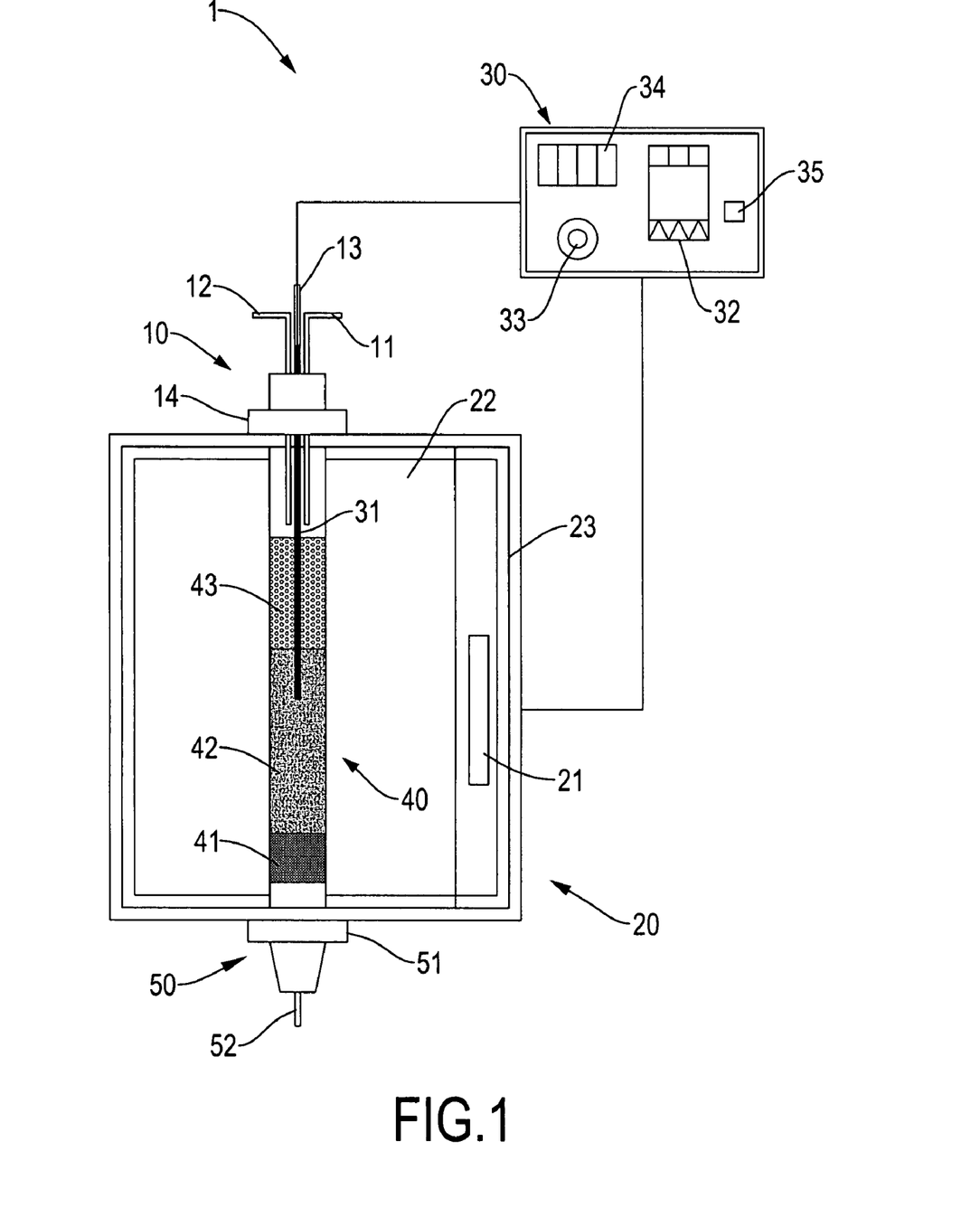
FIG. 1 is a schematic diagram of an apparatus of producing hydrogen by microwave in accordance with the present invention.

With reference to FIG. 1, an apparatus (1) of producing hydrogen by microwaves in accordance with the present invention comprises a microwave heater (20), a reaction tube (40), a cap (10), an output unit (50) and a microwave control box (30).

The microwave heater (20) comprises a housing (23), a heating chamber (22) and a magnetron (21). The housing (23) is metal to prevent microwave leakage. The heating chamber (22) is defined in the housing (23). The magnetron (21) is mounted in the housing (23) to produce and guide microwaves towards the heating chamber (22).

The reaction tube (40) is mounted in the heating chamber (22) of the microwave heater (20) and has a tube body, a supporting layer (41), a catalyst bed (42) and a thermal storage layer (43). The tube body has a top end and a bottom end and may be glass or quartz. Reactants, such as gases and liquids are added concurrently into the tube body from the top end of the tube body.

The supporting layer (41) is mounted in the tube body and may be ceramic or refractory wool. The catalyst bed (42) is mounted in the tube body on the supporting layer (41) to catalyze water gas shift or steam reforming reactions. The thermal storage layer (43) is mounted in the tube body on the catalyst bed (42) to store heat and vaporize liquid reactants into liquid vapor and may be refractory wool or glass beads. When the reaction tube (40) is exposed to microwaves, the reactants are heated rapidly and react with each other in the catalyst bed (42).

The cap (10) is mounted securely in the microwave heater (20) and comprises a connecting member and may comprise an upper cover (14) and a sealant. The connecting member has a gas inlet (11), a liquid inlet (12) and a sensor mount (13) which all communicate with the top end of the tube body of the reaction tube (40). The upper cover (14) is mounted around the connecting member and is metal to block microwaves. The sealant is applied around the gas inlet (11), the liquid inlet (12) and the sensor mount (13) to prevent gas leakage.

The outlet unit (50) comprises a mounting member, a lower cover (51) and an outlet tube (52). The mounting member is mounted on the housing (23) of the microwave heater (20). The lower cover (51) is mounted around the mounting member, is attached to the housing (23) of the microwave heater (20) and is metal to prevent microwave leakage. The outlet tube (52) extends through the mounting member and communicates with the bottom end of the tube body of the reaction tube (40) to allow product gases in the reaction tube (40) to exit for collection and analysis.

The microwave control box (30) is connected electrically to the microwave heater (20) to adjust power of the magnetron (21) and has a thermal sensor (31), a temperature setting unit (32), a power controller (33), a power display (34) and a power switch (35). The thermal sensor (31) is mounted through the sensor mount (13) and into the catalyst bed (42) to detect and transmit temperature in the catalyst bed (42) to the microwave control box (30). The temperature setting unit (32) sets a required reaction temperature for the catalyst bed (42). The power controller (33) is connected electrically to the thermal sensor (31), the temperature setting unit (32) and the magnetron (21) to adjust power of the magnetron (21) according to the temperature of the catalyst bed (42), to maintain the temperature of the catalyst bed (42) at the reaction temperature set by the temperature setting unit (32). The power display (34) is connected electrically to the power controller (32) to display the power of the magnetron (21). The power switch (35) selectively supplies power to the microwave heater (20).

Figure 2:
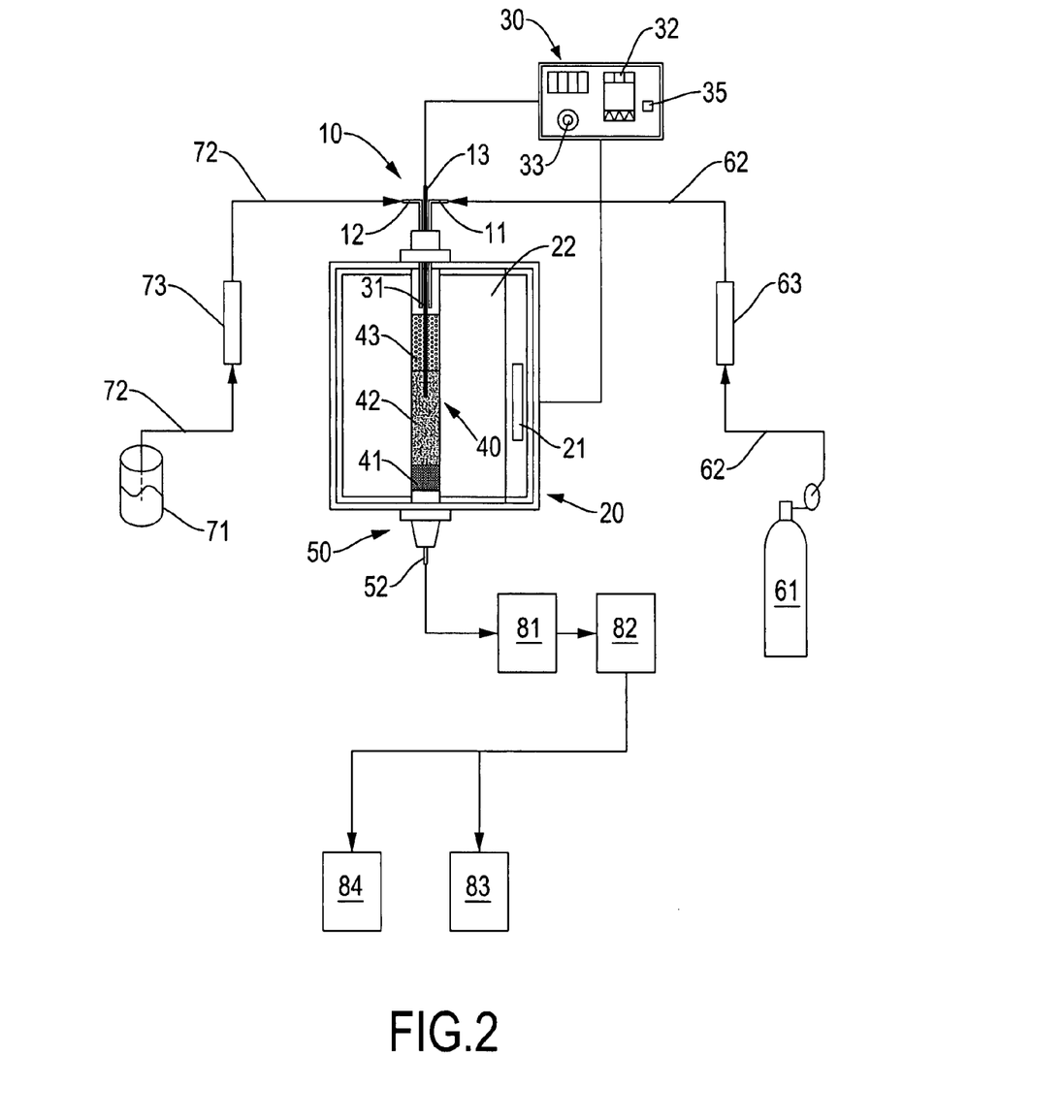
FIG. 2 is an operational schematic diagram of the apparatus in FIG. 1.

With further reference to FIG. 2, when the apparatus (1) is in use, a gas source (61) is connected to the gas inlet (11) by a gas pipe (62). A gas flow meter (63) is mounted in the gas pipe (62) to control gas flow rate. Similarly, a liquid source (71) is connected to the liquid inlet (12) through a liquid pipe (72). A liquid flow meter (73) is mounted in the liquid pipe (72) to control liquid flow rate.

When the temperature setting unit (32) is set to a reaction temperature required, the power switch (35) is turned on and microwaves radiate from the magnetron (21) into the heating chamber (22) of the microwave heater (20). Gas and liquid flow concurrently into the thermal storage layer (43) of the reaction tube (40). The liquid in the thermal storage layer is vaporized to form liquid vapor that mixes uniformly with the gas to form a mixed gas.

The mixed gas flows into the catalyst bed (42) and a hydrogen producing reaction is activated that converts the mixed gas into a product gas including hydrogen and by-products. The thermal sensor (31) and the power controller (33) regulate temperature in the catalyst bed (42). The product gas flows through the outlet tube (52) to a condenser (81) and a dryer (82) to completely remove water. Finally, the product gas is guided into a gas analyzing apparatus (83) and a gas chromatograph (84) to analyze concentrations of hydrogen and other by-products to monitor the hydrogen producing reaction.

A method of producing hydrogen by microwave in accordance with the present invention comprises steps of feeding gas and liquid, vaporizing liquid and heating a mixed gas.

In the step of feeding gas and liquid, gas and liquid at predetermined ratios are fed concurrently into the reaction tube (40) of the aforementioned apparatus (1) respectively through the gas inlet (11) and the liquid inlet (12) of the cap (10). The gas can be carbon monoxide, methane, synthesis gas or nitrogen as a carrier gas. The liquid can be water, a mixed liquid comprising methanol and water or ethanol and water whereby a volume ratio of methanol to water is 2:1~1:5 and a volume ratio of ethanol to water is 1:1~1:10.

In the step of vaporizing liquid, the liquid and gas flow into the thermal storage layer (43) of the reaction tube (40) to vaporize liquid to form liquid vapor that mixes uniformly with the gas to form a mixed gas.

In the step of heating the mixed gas, the mixed gas flows into the catalyst bed (42) of the reaction tube (40) and undergoes a hydrogen production reaction at a preset temperature reached and sustained by microwaves. The reaction temperature is 180° C. to 550° C.

When the gas is carbon monoxide and the liquid is water which is vaporized in the thermal storage layer (43) to form water vapor, the volume flow rate ratio of carbon monoxide to water vapor is 1:1~1:10 in the catalyst bed (42). The residence time of the mixed gas in the catalyst bed can be more than 0.1 sec.

When the gas is methane and the liquid is water which is vaporized in the thermal storage layer (43) to form water vapor, the volume flow rate ratio of methane to water vapor is 1:1~1:10 in the catalyst bed (42).

EXAMPLE 1

Water Gas Shift Reaction

Figure 3:
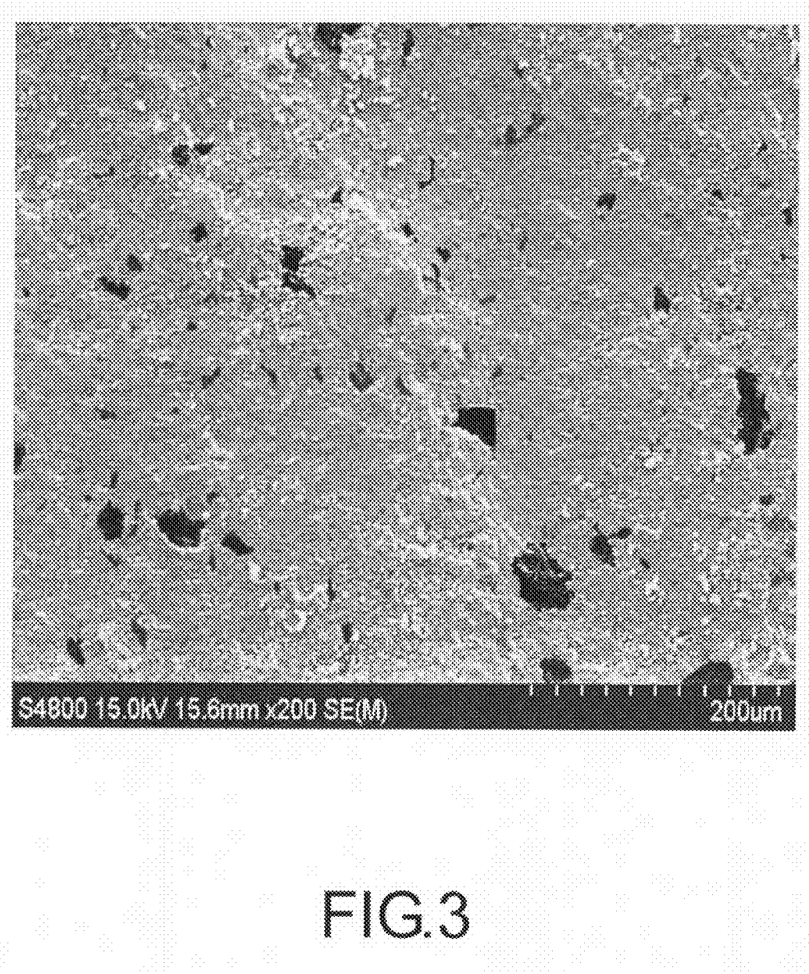
FIG. 3 is a SEM photo of a granular catalyst of the catalyst bed.

The gas source (61) was carbon monoxide and the liquid source (71) was water, which was vaporized in the heat storage layer (43) of the reaction tube (40) to form a water vapor. Water vapor mixed with carbon monoxide to form a mixed gas. The mixed gas flowed into the catalyst bed (42) to undergo water gas shift reaction and form a product gas including hydrogen, carbon dioxide and carbon monoxide. The volume flow rate ratio of water vapor to carbon monoxide in the reaction tube (40) was 8:1. The residence time of the mixed gas of water vapor and carbon monoxide in the catalyst bed (42) was 0.32 seconds. The catalyst bed (42) used a granular catalyst comprising 86~92 wt % ferric oxide, 6~10 wt % chromium hemitrioxide, 0.1~2.0 wt % chromium trioxide and 1.5~2.1 wt % copper oxide. With further reference to FIG. 3, a SEM photo of the granular catalyst showed a porous structure on the surface of the granular catalyst.

Figure 4:
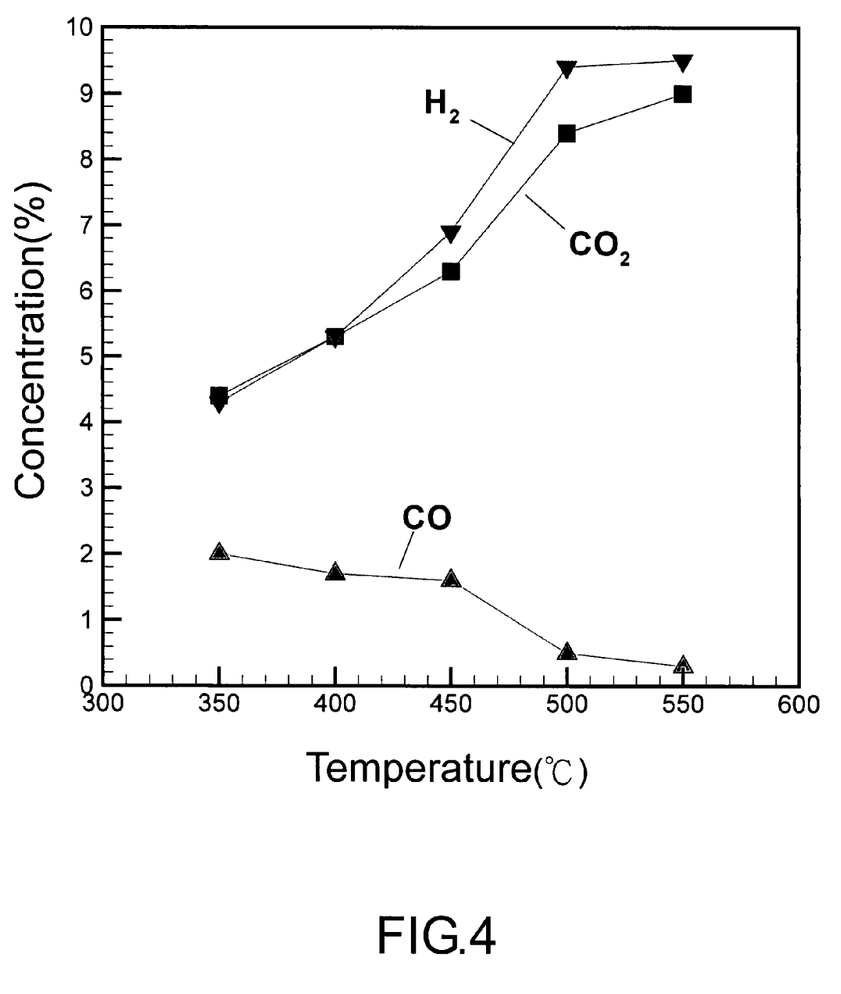
FIG. 4 is a graph of concentrations of hydrogen ($H_2$), carbon dioxide ($CO_2$) and carbon monoxide (CO) at different reaction temperatures.
Figure 5:
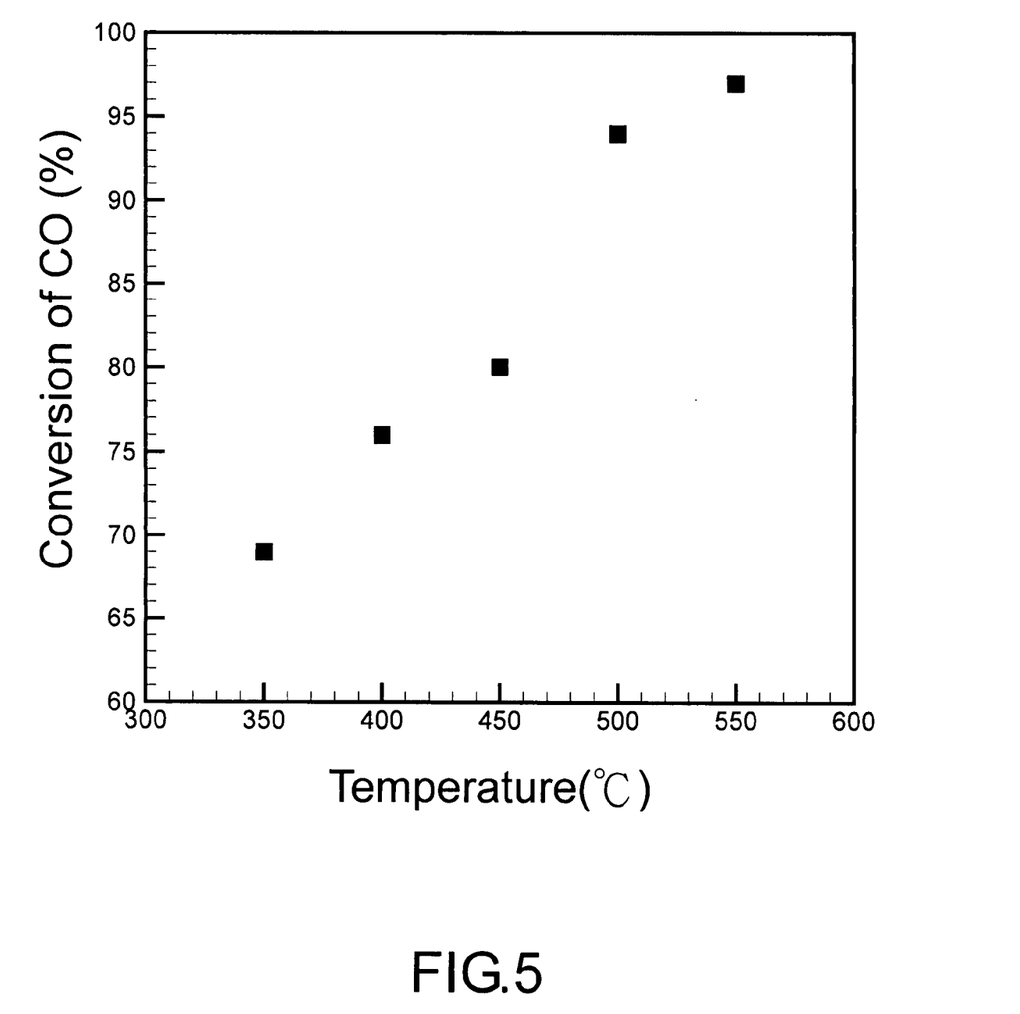
FIG. 5 is a graph of conversion of CO at different reaction temperatures.

With further reference to FIG. 4, the graph showed concentrations of hydrogen ($H_2$), carbon dioxide ($CO_2$) and carbon monoxide (CO) in the product gas after the water gas shift reaction whilst varying the temperature between 350° C. and 550° C. At 350° C., hydrogen and carbon dioxide were produced. With the elevation of the reaction temperature, concentrations of hydrogen and carbon dioxide increased and concentration of carbon monoxide decreased. With further reference to FIG. 5, the graph showed conversion of carbon monoxide at various reaction temperatures to indicate an efficiency of the water gas shift reaction. When the temperature was 350° C., the conversion of carbon monoxide was about 69%. With increased temperature, the conversion of carbon monoxide increased rapidly until reaching about 97% at 550° C. This demonstrates the efficiency of the water gas shift reaction was high at 550° C. using microwaves.

EXAMPLE 2

Steam Reforming

The gas source (61) was nitrogen and the liquid source (71) was a mixed liquid of water and methanol, which were vaporized in the heat storage layer (43) of the reaction tube (40) and mixed with nitrogen to form a mixed gas. The mixed gas flowed into the catalyst bed (42) to undergo stream reforming reaction and form a product gas including hydrogen, carbon dioxide, carbon monoxide and methane. The volume ratio of methanol to water was 1:1 and a volume flow rate of the mixed liquid was 0.8856 cc/minute and a volume flow rate of nitrogen was 500 cc/minute. The catalyst bed (42) used a granular nickel system catalyst.

Figure 6:
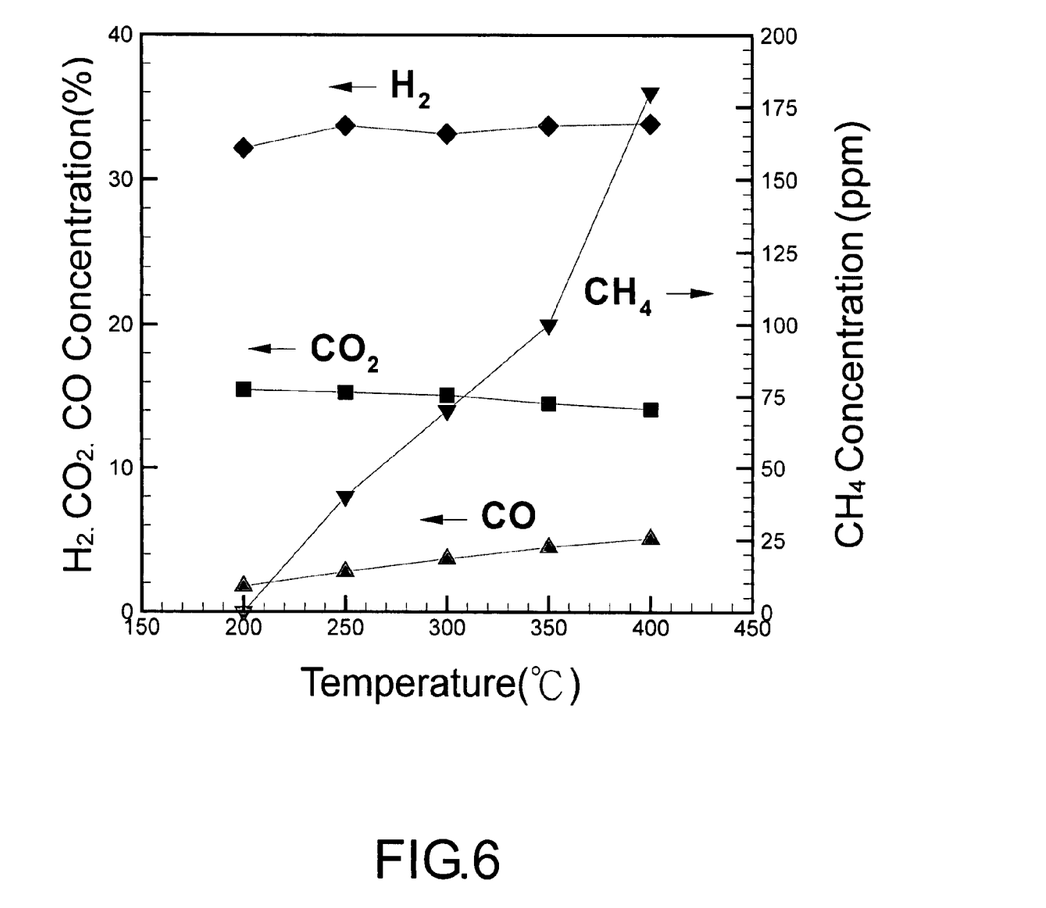
FIG. 6 is a graph of concentrations of $H_2$, $CO_2$, CO and methane ($CH_4$) at different reaction temperatures.
Figure 7:
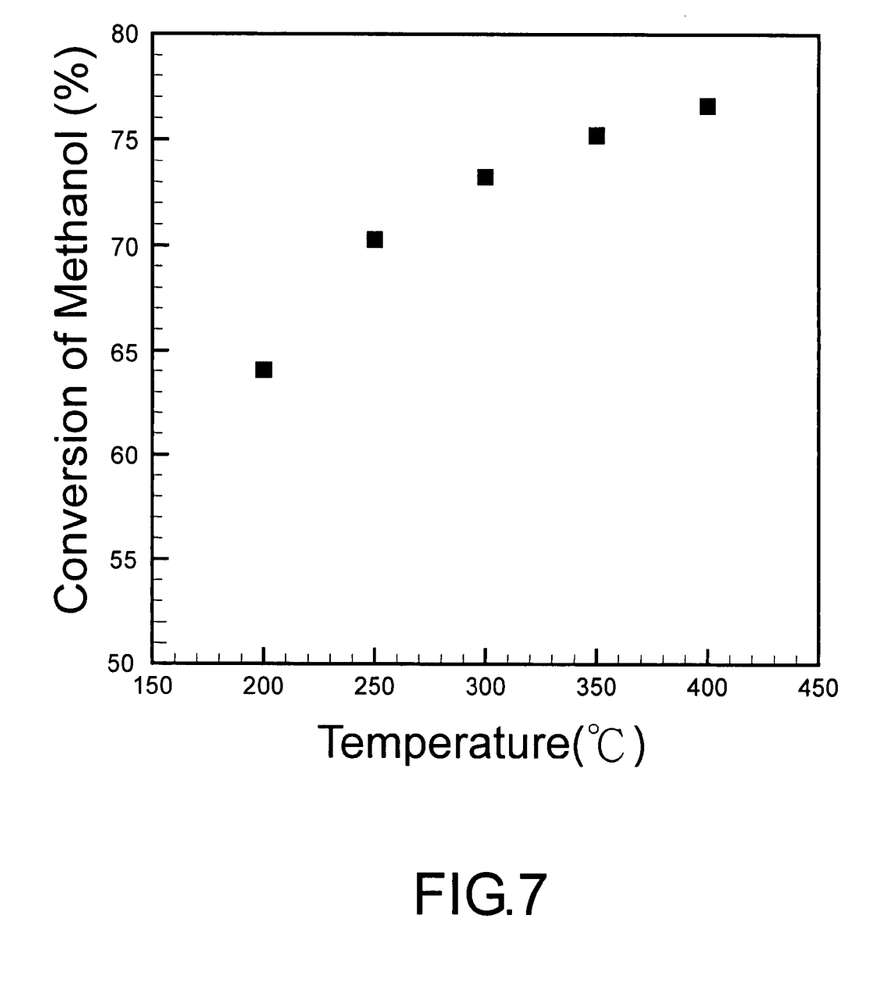
FIG. 7 is a graph of conversion of methanol at different reaction temperatures.

With further reference to FIG. 6, the graph showed concentrations of hydrogen ($H_2$), carbon dioxide ($CO_2$), carbon monoxide (CO) and methane ($CH_4$) in a product gas after the stream reforming reaction with varying temperature from 200° C. to 400° C. When the reaction temperature was 200° C., hydrogen and carbon dioxide were produced at around 32% and 15.5% respectively. Concentrations of carbon monoxide and methane were about 1.8% and 0 ppm respectively. As the reaction temperature increased, the concentration of hydrogen did not vary significantly, the concentration of carbon dioxide decreased slightly, the concentration of carbon monoxide increased slowly and the concentration of methane increased rapidly. At 400° C., the concentration of methane was about 180 ppm but was still low relative to the concentrations of hydrogen, carbon dioxide and carbon monoxide. With further reference to FIG. 7, the graph showed conversion of methanol at various temperatures to indicate the efficiency of the stream reforming reaction. At 200° C., the conversion of methanol was about 64%. As the reaction temperature increased, the conversion of methanol increased until 400° C., when the conversion of methanol was about 77%, that demonstrates the stream reforming reaction performed well using microwaves.

The apparatus (1) of producing hydrogen by microwave in accordance to the present invention has advantages of:

1. The reaction of hydrogen production such as water gas shift or stream reforming can be performed in a small space with short heating time to convert water, alcohol or hydrocarbons into hydrogen using microwaves.

2. The apparatus (1) is suitable to perform the reaction of hydrogen production in presence of water using microwaves. So reactants in the reaction tube can be heated rapidly and energy efficiency is elevated.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. An apparatus for producing hydrogen by microwave comprising:
    a microwave heater comprising
        a housing being metal;
        a heating chamber being defined in the housing; and
        a magnetron being mounted in the housing to produce and guide microwaves towards the heating chamber;
    a reaction tube being mounted in the heating chamber of the microwave heater and having
        a tube body having a top end and a bottom end;
        a supporting layer being mounted in the tube body;
        a catalyst bed being mounted in the tube body on the supporting layer; and
        a thermal storage layer being mounted in the tube body on the catalyst bed;
    a cap being mounted in the microwave heater and comprising
        a connecting member having a gas inlet, a liquid inlet and a sensor mount which all communicate with the top end of the tube body of the reaction tube;
    an output unit comprising
        a mounting member being mounted on the housing of the microwave heater; and
        an outlet tube extending through the mounting member and communicating with the bottom end of the tube body of the reaction tube; and
    a microwave control box being connected electrically to the microwave heater and having
        a thermal sensor being mounted through the sensor mount and into the catalyst bed;
        a temperature setting unit; and
        a power controller being connected electrically to the thermal sensor, the temperature setting unit and the magnetron.

2. The apparatus for producing hydrogen by microwave as claimed in claim 1, wherein the cap further comprises a metal upper cover mounted around the connecting member and attached to the housing of the microwave heater.

3. The apparatus for producing hydrogen by microwave as claimed in claim 2, wherein the output unit further comprises a metal lower cover mounted around the mounting member and attached to the housing of the microwave heater.

4. The apparatus for producing hydrogen by microwave as claimed in claim 3, wherein the microwave control box further has
    a power display being connected electrically to the power controller to display the power of the magnetron; and
    a power switch selectively supplying power to the microwave heater.

5. The apparatus for producing hydrogen by microwave as claimed in claim 1, wherein the catalyst bed uses a granular catalyst comprising 86~92 wt % ferric oxide, 6~10 wt % chromium hemitrioxide, 0.1~2.0 wt % chromium trioxide and 1.5~2.1 wt % copper oxide.

6. A method of producing hydrogen by microwave comprising steps of
    feeding gas and liquid into an apparatus as claimed in claim 1, wherein a gas and a liquid are fed concurrently into the reaction tube of the apparatus as claimed in claim 1 respectively through the gas inlet and the liquid inlet of the cap;

vaporizing the liquid, wherein the liquid and gas flow into the thermal storage layer of the reaction tube to vaporize liquid to form liquid vapor that mixes uniformly with the gas to form a mixed gas; and heating the mixed gas, wherein the mixed gas flows into the catalyst bed of the reaction tube and undergoes a hydrogen production reaction at a preset temperature reached and sustained by microwaves.

7. The method of producing hydrogen by microwave as claimed in claim 6, wherein the hydrogen production reaction is a water gas shift or stream reforming reaction.

8. The method of producing hydrogen by microwave as claimed in claim 6, wherein the reaction temperature is 180° C. to 550° C.

9. The method of producing hydrogen by microwave as claimed in claim 8, wherein gas is carbon monoxide and liquid is water.

10. The method of producing hydrogen by microwave as claimed in claim 9, wherein a volume flow rate ratio of carbon monoxide to water vapor is 1:1~1:10 in the catalyst bed.

11. The method of producing hydrogen by microwave as claimed in claim 10 wherein the residence time of the mixed gas in the catalyst bed is more than 0.1 sec.

12. The method of producing hydrogen by microwave as claimed in claim 8, wherein gas is nitrogen as a carrier gas and liquid is a mixed liquid of methanol and water.

13. The method of producing hydrogen by microwave as claimed in claim 12, wherein the volume ratio of methanol to water is 2:1~1:5.

14. The method of producing hydrogen by microwave as claimed in claim 6, wherein gas is nitrogen as a carrier gas and liquid is a mixed liquid of ethanol and water.

15. The method of producing hydrogen by microwave as claimed in claim 14, wherein the volume ratio of ethanol to water is 1:1~1:10.

16. The method of producing hydrogen by microwave as claimed in claim 6, wherein gas is synthetic gas and liquid is water.

17. The method of producing hydrogen by microwave as claimed in claim 6, wherein gas is methane and liquid is water.

18. The method of producing hydrogen by microwave as claimed in claim 17, wherein the volume flow rate ratio of methane to water vapor is 1:1~1:10 in the catalyst bed.

19. The method of producing hydrogen by microwave as claimed in claim 6, wherein the thermal storage layer is refractory wool or glass beads.

* * * * *